(12) United States Patent
Yu et al.

(10) Patent No.: US 11,190,954 B2
(45) Date of Patent: Nov. 30, 2021

(54) BASE STATION MANAGEMENT APPARATUS AND CONTROL METHOD THEREOF

(71) Applicants: SK TELECOM CO., LTD., Seoul (KR); INDUSTRY-ACADEMIC COOPERATION FOUNDATION, YONSEI UNIVERSITY, Seoul (KR)

(72) Inventors: Tak Ki Yu, Yongin-si (KR); Young Lak Kim, Yongin-si (KR); Min Soo Na, Seongnam-si (KR); Sung Ho Moon, Anyang-si (KR); Tae Guen Kim, Seongnam-si (KR); Dae Sik Hong, Seoul (KR); Yo Seop Park, Anyang-si (KR); Kwon Jong Lee, Seoul (KR); Hyun Soo Kim, Seoul (KR); Han Ho Wang, Seongnam-si (KR)

(73) Assignees: SK TELECOM CO., LTD., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 462 days.

(21) Appl. No.: 15/501,066

(22) PCT Filed: May 19, 2015

(86) PCT No.: PCT/KR2015/005022
§ 371 (c)(1),
(2) Date: Feb. 1, 2017

(87) PCT Pub. No.: WO2016/017912
PCT Pub. Date: Feb. 4, 2016

(65) Prior Publication Data
US 2017/0257781 A1    Sep. 7, 2017

(30) Foreign Application Priority Data

Aug. 1, 2014   (KR) .................. 10-2014-0099288

(51) Int. Cl.
*H04W 52/02*       (2009.01)
*H04B 17/318*      (2015.01)
(Continued)

(52) U.S. Cl.
CPC .......... *H04W 16/32* (2013.01); *H04B 17/318* (2015.01); *H04B 17/345* (2015.01);
(Continued)

(58) Field of Classification Search
USPC ........................................................ 370/252
See application file for complete search history.

(56) References Cited

U.S. PATENT DOCUMENTS

| 9,131,363 B2* | 9/2015 | Vujcic ................ H04B 7/15507 |
| 2011/0105107 A1* | 5/2011 | Kwon ................ H04W 28/06 |
| | | 455/422.1 |

(Continued)

FOREIGN PATENT DOCUMENTS

| KR | 10-2011-0041768 A | 4/2011 |
| KR | 10-2011-0048759 A | 5/2011 |

(Continued)

OTHER PUBLICATIONS

International Search Report dated Aug. 20, 2015 for PCT/KR2015/005022, citing the above references.

(Continued)

*Primary Examiner* — Gregory B Sefcheck
*Assistant Examiner* — Majid Esmaeilian
(74) *Attorney, Agent, or Firm* — Hauptman Ham, LLP

(57) ABSTRACT

A base station controller optimally controls activation/deactivation of small base stations in a heterogeneous network (Continued)

environment in which a number of base stations forming cells of different sizes coexist in the same area, taking into account traffic volume as well as signal interference. A method for operating the base station controller is also disclosed.

13 Claims, 4 Drawing Sheets

(51) Int. Cl.
*H04W 24/08* (2009.01)
*H04W 16/32* (2009.01)
*H04W 88/12* (2009.01)
*H04W 24/00* (2009.01)
*H04B 17/345* (2015.01)
*H04W 84/04* (2009.01)

(52) U.S. Cl.
CPC ........... *H04W 24/00* (2013.01); *H04W 24/08* (2013.01); *H04W 52/0206* (2013.01); *H04W 88/12* (2013.01); *H04W 84/045* (2013.01)

(56) References Cited

U.S. PATENT DOCUMENTS

| | | | | |
|---|---|---|---|---|
| 2011/0216953 | A1* | 9/2011 | Callahan | G06K 9/00 382/128 |
| 2011/0268087 | A1* | 11/2011 | Kwon | H04L 5/0005 370/331 |
| 2012/0176996 | A1* | 7/2012 | Kim | H04W 72/0413 370/329 |
| 2013/0322251 | A1* | 12/2013 | Kotecha | H04W 28/24 370/236 |
| 2014/0329551 | A1* | 11/2014 | Ryoo | H04W 76/27 455/522 |
| 2015/0092701 | A1* | 4/2015 | Horn | H04W 84/12 370/329 |
| 2015/0124728 | A1* | 5/2015 | Bergstrom | H04L 5/001 370/329 |
| 2016/0088522 | A1* | 3/2016 | Lu | H04B 7/0404 370/235 |
| 2016/0345338 | A1* | 11/2016 | Kim | H04L 1/1822 |
| 2017/0347270 | A1* | 11/2017 | Iouchi | H04W 16/14 |

FOREIGN PATENT DOCUMENTS

| | | |
|---|---|---|
| KR | 10-2011-0108885 A | 10/2011 |
| KR | 10-2014-0009494 A | 1/2014 |
| WO | 2013174771 A1 | 11/2013 |

OTHER PUBLICATIONS

L. Saker et al., "Optimal Control of Wake Up Mechanisms of Femtocells in Heterogeneous Networks", IEEE Journal on Selected Areas in Communications, Mar. 22, 2012, vol. 30, Issue No. 3, IEEE.

Korean Office Action dated Oct. 2, 2015 in connection with the counterpart Korean Patent Application No. 10-2014-0099288, citing the above reference(s).

Chinese Office Action for corresponding Chinese application No. 201580041681.9 dated Jun. 4, 2019, citing the above references.

* cited by examiner

BASE STATION MANAGEMENT APPARATUS AND CONTROL METHOD THEREOF

CROSS REFERENCE TO RELATED APPLICATION

This application is the National Phase application of International Application No. PCT/KR2015/005022, filed on May 19, 2015, which is based upon and claims the benefits of priorities under 35 U.S.C § 119(a) of Korean Patent Application No. 10-2014-0099288, filed on Aug. 1, 2014, with the Korean Intellectual Property Office (KIPO), the entire contents of which are incorporated herein by reference.

TECHNICAL FIELD

The present disclosure relates to a base station controller capable of optimally controlling activation/deactivation of small base stations in a heterogeneous network environment in which a number of base stations forming cells of different sizes coexist in the same area, taking into account traffic volume as well as signal interference, and a method for operating the base station controller.

BACKGROUND ART

In a heterogeneous network environment in which a number of base stations forming cells of different sizes coexist in the same area, various types of small base stations having a smaller cell coverage are disposed, as well as typical macro base stations. Accordingly, various types of base stations form macro cells and small cells in overlapped areas to provide wireless communications service to users.

In such a heterogeneous network environment, small cells are typically included in a macro cell, and small base stations are densely disposed. Accordingly, signal interference between the macro base station and the small base stations or signal interference between the small base stations take place.

In order to solve the signal interference between the base stations, there has been proposed a scheme that operates small base stations by turning on/off them (i.e., activating/deactivating them) as needed in a heterogeneous network environment.

Previously, according to an existing scheme for turning on/off small base stations in a macro cell, if the traffic volume in the macro cell increases, more small base stations are activated.

That is, according to the existing scheme for turning on/off small base stations, activation/deactivation of small base stations are determined based only on the traffic volume. However, when a large number of small base stations are activated, the signal interference between the base stations rather increases, such that the SINR of user terminals may be degraded and service quality may be lowered.

In view of the above, exemplary embodiments of the present disclosure propose a scheme for optimally controlling activation/deactivation of small base stations in a heterogeneous network environment.

DISCLOSURE

Technical Problem

It is an object of the present disclosure to provide a base station controller capable of optimally controlling activation/deactivation of small base stations in a heterogeneous network environment in which a number of base stations forming cells of different sizes coexist in the same area, taking into account traffic volume as well as signal interference, and a method for operating the base station controller.

Technical Solution

In accordance with one aspect of the present disclosure, a base station controller includes: a traffic volume check unit configured to check a traffic volume of each of base stations; an interference check unit configured to check signal interference with an adjacent base station for each of the base stations; an activation index calculation unit configured to calculate an activation index for each of the base stations based on the traffic volume and the signal interference of each of the base stations; and a base station control unit configured to determine whether to activate each of the base stations based on the activation index for each of the base stations.

The base station control unit may sequentially activate the base stations from a base station with a largest activation index among the base stations, based on the activation index of each of the base stations.

The traffic volume of each of the base stations may be obtained from measurements of the strength of an uplink signal received at each of the base stations from one or more terminals or signals received through an uplink channel at each of the base stations.

The signal interference of each of the base stations may be expressed according to the received signal strength indicator (RSSI) that is fed back to each of the base stations from a terminal.

The activation index of each of the base stations may be calculated as a large value as the traffic volume is larger, as the signal interference is smaller or as the traffic volume is larger and the signal interference is smaller.

The activation index calculation unit may calculate the activation index by applying a first weight to a signal interference of each of the base stations and applying a second weight to a traffic amount of each of the base stations, and wherein at least one of the first weight and the second weight is differently applied based on at least one of a specific frequency band used by the plurality of base stations, an average distance between the base stations in the plurality of base stations, a signal transmission strength of the plurality of base stations, and a density of terminals in a specific cell associated with the plurality of base stations.

The second weight may become larger than the first weight when the frequency band is different from a frequency band of the cell, as the average distance among the base stations becomes larger, as the signal transmission strength becomes smaller, or as the number of the small base stations becomes smaller, and the second weight may become equal to or smaller than the first weight as the frequency band becomes closer to the frequency band of the cell, as the average distance among the base stations becomes smaller, as the signal transmission strength becomes larger, as the number of the base stations becomes larger, or as the concentration degree of terminals becomes larger.

The base station control unit may sequentially selects and activate a base station in a descending order from one with the largest activation index, and measure a network environment whenever activating the selected base station, to operate at least one previously activated base station and the selected base station in an activated state and the other base stations in a deactivated state, when the measured network environment satisfies a predetermined operation holding condition.

The network environment may include a change in a cell capacity of the cell before and after the activation of the selected base station, or a connection ratio of terminals connected to the activated base stations with respect to entire terminals in the cell, and the operation holding condition may be satisfied when the change in the cell capacity is equal to less than a predetermined first threshold or the connection ratio of the terminals is equal to greater than a predetermined second threshold.

In accordance with another aspect of the present disclosure, a method for operating a base station controller includes: checking a traffic volume of each of base stations; checking a signal interference of each of the base stations with an adjacent base station; calculating an activation index for each of the base stations based on the traffic volume and the signal interference of each of the base stations; and determining whether to activate each of the base stations based on the activation index of each of the base stations.

The determining may include sequentially activating the base stations from a base station with a largest activation index among the base stations, based on the activation index of each of the base stations The activation index of each of the base stations may be calculated as a larger value as the traffic volume is larger, as the signal interference is smaller or as the traffic volume is larger and the signal interference is smaller.

The calculating may include the activation index by applying a first weight to a signal interference of each of the base stations and applying a second weight to a traffic amount of each of the base stations, and wherein at least one of the first weight and the second weight is differently applied based on at least one of a specific frequency band used by the plurality of base stations, an average distance between the base stations in the plurality of base stations, a signal transmission strength of the plurality of base stations, and a density of terminals in a specific cell associated with the plurality of base stations.

The determining may include sequentially selecting and activating a base station in a descending order from one with the largest activation index, and measure a network environment whenever activating the selected base station, to operate at least one previously activated base station and the selected base station in an activated state and the other base stations in a deactivated state, when the measured network environment satisfies a predetermined operation holding condition.

An operation setting period and an operation holding period are repeated periodically. Each of the base stations may be activated or deactivated during the operation setting period based on its activation index, and the operation of each of the base stations may be held in the activated or deactivated state as determined when the operation holding condition is satisfied during the operation holding period.

Advantageous Effects

According to exemplary embodiments of the present disclosure, the base station controller and the method for operating the same can optimally control the activation/deactivation of the small base stations by taking into account both of traffic volume and signal interference in a heterogeneous network environment, thereby increasing system performance while improving signal interference in the heterogeneous network environment.

BEST MODE

Hereinafter, an exemplary embodiment of the present disclosure will be described with reference to the accompanying drawings.

Figure 1:
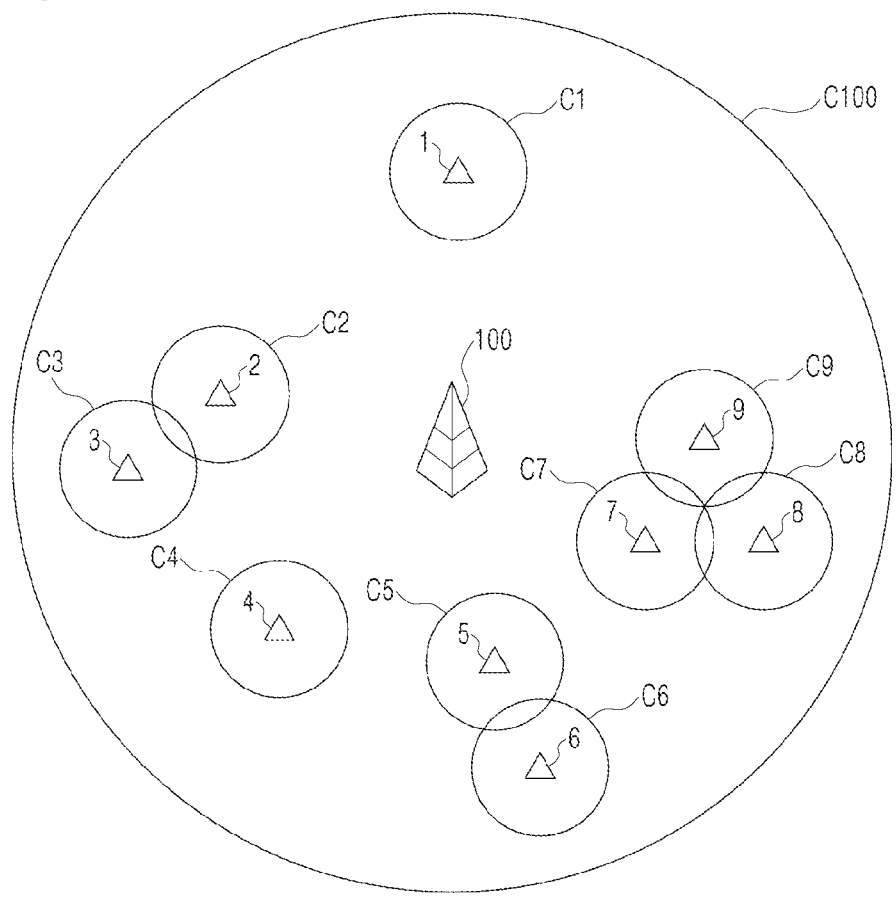
FIG. 1 is a view showing an example of a heterogeneous network environment employing the present disclosure.

FIG. 1 is a view showing an example in which a macro base station 100 and a number of small base stations 1 to 9 coexist.

As shown in FIG. 1, in the heterogeneous network environment employing the present disclosure, the macro base station 100 and small base stations 1 to 9 coexist. Each of the small base stations 1 to 9 forms cells C1 to C9, respectively, which are included in the cell coverage C100 of the macro base station 100.

It is to be understood that several macro base stations as well as the macro base station 100 may exist in the heterogeneous network environment, and at least one small base station may exist in a cell of each of the macro base stations, like the small base stations 1 to 6 are located in the cell C100 of the macro base station 100.

In the following description, however, the single macro base station 100 and the small base stations 1 to 9 located in the cell C100 of the macro base station 100 as shown in FIG. 1 will be described for convenience of illustration.

In such a heterogeneous network environment, the cells of the small base stations 1 to 9, i.e., small cells C1 to C9 are typically included in the cell of the macro base station 100, i.e., the macro cell C100, and the small base stations disposed closely to one another. Accordingly, signal interference between the macro base station and the small base stations or signal interference between the small base stations take place.

In order to solve the signal interference between the base stations, there has been proposed a scheme that small base stations are turned on/off (i.e., activated/deactivated) as needed in a heterogeneous network environment.

Previously, according to an existing scheme for turning on/off small base stations in a macro cell, if the traffic volume in the macro cell increases, more small base stations are activated.

That is, according to the existing scheme for turning on/off small base stations, activation/deactivation of small base stations are determined based only on the traffic volume. Therefore, when a large number of small base stations are activated, the signal interference between the base stations rather increases, such that the SINR of user terminals (not shown) may be degraded and service quality may be lowered.

In view of the above, exemplary embodiments of the present disclosure propose a scheme for optimally controlling activation/deactivation of small base stations by taking into account both of traffic volume and signal interference in a heterogeneous network environment. More specifically, exemplary embodiments of the present disclosure propose a base station controller that can realize the scheme.

Hereinafter, a base station controller according to an exemplary embodiment of the present disclosure will be described in detail with reference to FIG. 2.

Figure 2:
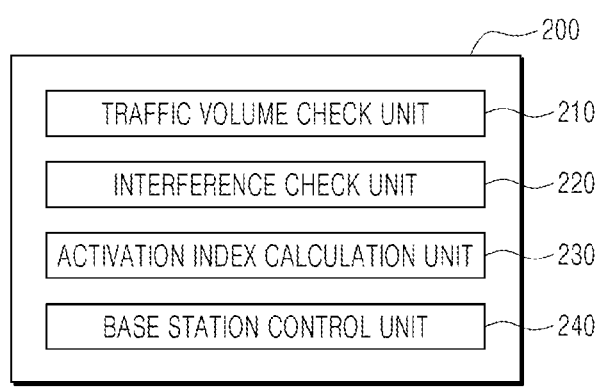
FIG. 2 is a block diagram of a base station controller according to an exemplary embodiment of the present disclosure.

As shown in FIG. 2, the base station controller 200 according to the exemplary embodiment of the present disclosure includes a traffic volume check unit 210, an interference check unit 220, an activation index calculation unit 230, and a base station control unit 240.

In other words, by using the above-described functional units, the base station controller 200 can optimally control on/off (i.e., activation/deactivation) of the small base stations located in the same macro cell, taking into account traffic volume together with signal interference.

The base station controller 200 may control the activation/deactivation of the small base stations in a macro cell of a macro base station, or may control the activation/deactivation of the small base stations in a macro cell of each of several macro base stations.

Figure 3:
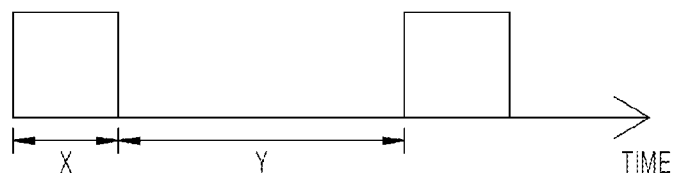
FIG. 3 is a view showing an example of an operation setting period and an operation holding period according to an exemplary embodiment of the present disclosure.

In addition, in controlling the activation/deactivation of the small base stations, the base station controller 200 may be operated in different periods, i.e., an operation setting period X in which activation or deactivation of the small base stations are determined, and an operation holding period Y in which the small base stations are held in the determined activated or deactivated state, as shown in FIG. 3.

That is, the base station controller 200 determines the activation or deactivation for each of the small base stations during the operation setting period X and holds the small base stations in the determined activated or deactivated state during the operation holding period Y. After the operation holding period Y, the base station controller 200 is operated again in the operation setting period X and the operation holding period Y.

In other words, the base station controller 200 may periodically perform the operations of controlling the activation/deactivation of the small base stations, with the operation setting period X and the operation holding period Y as one cycle (X+Y).

In the following description, the single macro base station 100 and the small base stations 1 to 9 located in the same cell C100 of the macro base station 100 as shown in FIG. 1 will be described for convenience of illustration.

Hereinafter, the functional units included in the base station controller 200 according to an exemplary embodiment of the present disclosure will be described in more detail.

The traffic volume check unit 210 checks the traffic volume of each of a number of base stations.

The traffic volume of each of the base stations is obtained from measurements of the strength of an uplink signal received at each of the base stations from one or more terminals or a signal received via an uplink channel at each of the base stations.

Preferably, in the heterogeneous network environment as shown in FIG. 1, a number of base stations described above is small base stations located in the same macro cell, for example, the small base stations 1 to 9 located in the macro cell C100.

Accordingly, the traffic volume check unit 210 checks the traffic volume of each of the base stations belonging to the number of base stations, that is, the small base stations 1 to 9.

The checked traffic volume of one of the small base stations 1 to 9, e.g., the small base station 1 will be described. The traffic volume of the small base station 1 may vary depending on its measurements of the strength of an uplink signal received from one or more user terminals (not shown) or a signal received via an uplink channel.

That is, the small base station 1 may receive uplink signals such as PRACH (Physical Random Access Channel), PUCCH (Physical Uplink Control Channel), PUSCH (Physical Uplink Shared Channel) and SRS (Sounding Reference Signal) from one or more user terminals (not shown) and may measure the strength of the received uplink signal, i.e., the received power.

In addition, to increase the accuracy of the measurements of the traffic volume around the small base station 1 at the current time, the small base station 1 may measure the strength of the received uplink signals received from one or more user terminals (not shown) for a preset time interval T to obtain the sum of these values as the measurements of the strength of the received signals.

Alternatively, the small base station 1 may measure the strength, i.e., the received power of all signals received through the uplink channel, besides the uplink signals from the one or more user terminals (not shown).

In addition, to increase the accuracy of the measurements of the traffic volume around the small base station 1 at the current time, the small base station 1 may measure the strength of all signals received through the uplink channel for the preset time interval T to obtain the sum of these values as the measurements of the strength of the received signals.

It is to be understood that the other small base stations 2 to 9 may also obtain the measurements of the strength of received signals like the small base station 1.

In other words, each of the small base stations 1 to 9 may obtain the measurements of the strength of the received signals by measuring the energy of the uplink signal in the frequency band it uses for the preset time interval T.

In addition, each of the small base stations 1 to 9 provides the measurement of the strength of the received signals (i.e. the energy of the uplink signal) to the base station controller 200, which is measured by each of the small base stations 1 to 9, respectively.

For example, each of the small base stations 1 to 9 may provide the measurement of the strength of the received signals to the base station controller 200 through a wired or wireless backhaul connected to the base station controller 200. Alternatively, each of the small base stations 1 to 9 may transmit the measurement of the strength of received signals to the base station controller 200 via a BU (baseband unit) that manages the small base stations 1 to 9 as RUs (remote radio units).

The traffic volume check unit 210 may check the measurements of the strength of received signals provided from the base stations 1 to 9 as the traffic volume of the small base stations 1 to 9.

The traffic volume of each of the small base stations 1 to 9 means the traffic volume around the small base stations 1 to 9 rather than the traffic volume actually received by the small base stations 1 to 9.

Previously, according to the existing scheme for turning on/off the small base stations, the activation/deactivation of the small base stations was determined taking into account the traffic volume. However, the traffic volume in the existing scheme refers to the traffic volume received by the small base stations operated in the activated state, rather than the traffic volume around the small base stations.

Consequently, previously there is no specific method for checking (measuring) the traffic volume around small base stations.

In contrast, according to an exemplary embodiment of the present disclosure, the base station controller 200, especially the traffic volume check unit 210 may check (measure) the traffic value around each of the small base stations based on the signal reception strength of an uplink signal received from a user terminal (not shown) or the strength of all signals received through the uplink channel at each of the small base stations for a predetermined time interval. Accordingly, according to an exemplary embodiment of the present disclosure, the traffic volume around each of the small base stations can be measured indirectly with a relatively high accuracy.

The interference check unit 220 checks the signal interference of each of the small base stations 1 to 9 by an adjacent base station.

For a small base station, e.g., the small base station 1, the adjacent base station may refer to the macro base station 100 or another small base station (e.g., one of the smaller base stations 2 to 9).

The signal interference of each of the base stations is related to the received signal strength indicator (RSSI) that is fed back to each of the base stations from a terminal.

The checked signal interference of one of the small base stations 1 to 9, e.g., the small base station 1 will be described. The signal interference of the small base station 1 may vary depending on the RSSI that is fed back to the small base station 1 from a user terminal (not shown).

The small base station 1 may measure the RSSI of a downlink that is fed back by a user terminal (not shown).

For example, for the small base station 1 in the deactivated state, the RSSI can be measured through the resources of the downlink channel. For the small base station 1 in the activate state, the RSSI can be measured through unallocated resources among the resources of the downlink channel.

It is to be understood that the other small base stations 2 to 9 may also measure the RSSI of the downlink as described above, like the small base station 1.

In addition, each of the small base stations 1 to 9 may provide the RSSI of the downlink it has measured to the base station controller 200 through a backhaul or a BU as described above.

Accordingly, the interference check unit 220 may check the RSSI provided from each of the small base stations 1 to 9 as the signal interference of each of the small base stations 1 to 9.

In this regard, a large value of the RSSI fed back from a user terminal (not shown) may indicate that that a signal received by the user terminal (not shown) contains a large amount of signals from an adjacent base station, i.e., a large signal interference.

The activation index calculation unit 230 calculates the activation index of each of the small base stations 1 to 9 based on the traffic volume and signal interference of each of the small base stations 1 to 9.

The activation index of each of the base stations is calculate as a large value when the traffic volume is large, when the signal interference is small, or when the traffic volume is large and the signal interference is small.

That is, in calculating the activation index for each of the small base stations 1 to 9, the activation index calculation unit 230 may calculate the activation index of a small base station having a larger traffic volume as a larger value, while may calculate the activation index of a small base station having a smaller signal interference as a larger value.

More specifically, the activation index calculation unit 230 may apply a first weight to the signal interference of each of the small base stations 1 to 9 and a second weight to the traffic volume of each of the small base stations, to calculate activation indices.

Hereinafter, a process of calculating the activation index for one of the small base stations 1 to 9, for example, the small base station 1 will be described.

The activation index calculation unit 230 may apply a first weight to the signal interference of the small base station 1 and a second weight to the traffic volume of the small base station 1, to calculate the activation index for the small base station 1.

For example, the activation index may be expressed by Equation 1 below:

$$\Gamma_i = -\eta_1 B_i + \eta_2 \Phi_i \quad \text{[Equation 1]}$$

where $B_i$ denotes the signal interference of the $i^{th}$ small base station, i.e., the RSSI of the downlink measured by the small base station, and $\Phi_i$ denotes the traffic volume of the $i^{th}$ small base station, i.e., the measurements of the strength of received signals that is the sum of the measurements by the small base station for a predetermined time interval. In addition, $\eta_1$ denotes the first weight, and the $\eta_2$ denotes the second weight.

The activation index calculation unit 230 may apply the first weight $\eta_1$ to the signal interference $B_1$ of the small base station 1, and the second weight $\eta_2$ to the traffic volume $\Phi_1$ of the small base station 1 according to Equation 1, to calculate the activation index $\Gamma_1$ of the small base station 1.

The activation index calculation unit 230 may calculate the activation index of each of the other small base stations 2 to 9 according to Equation 1 as well as the small base station 1.

According to the exemplary embodiment of the present disclosure, the base station controller 200 may apply the first weight $\eta_1$ and the second weight $\eta_2$ differently depending on the environmental factors of the heterogeneous network environment, such that the activation index calculated for each of the small base stations may be adjusted.

For example, the first weight $\eta_1$ and/or the second weight $\eta_2$ may be applied differently based on at least one of: a frequency band used by each of the base stations, i.e., each of the small base stations 1 to 9, the average distance among the small base stations 1 to 9, the signal transmission strength of each of the small base stations 1 to 9, the concentration degree of terminals in a particular cell associated with the base stations 1 to 9, and the number of the base stations 1 to 9.

Herein, the particular cell associated with the small base stations 1 to 9 refers to the macro cell C100 including the small cells C1 to C9 of the small base stations 1 to 9.

The number of small base stations 1 to 9 refers to the total number of small base stations located in the same macro cell C100.

Herein, the concentration degree of terminals in a particular cell refers to a degree of distribution of terminals in the macro cell C100 in a certain area. A smaller value of the concentration degree indicates that terminals are evenly distributed in the macro cell C100.

The signal transmission strength of each of the small base stations 1 to 9 refers to a transmission power of a downlink signal, which is a major factor for forming the coverage of a small cell. The average distance among base stations refers to the average calculated from the sum of the distances among the small base stations 1 to 9 located in the same macro cell C100.

The frequency band used by each of the small base stations 1 to 9 refers to a frequency resource band that it uses for transmitting and receiving signals.

For example, the first weight $\eta_1$ and/or the second weight $\eta_2$ may be applied differently to Equation 1, based on the above-described environmental factors, such as at least one of: a frequency band used by each of the small base stations 1 to 9, the average distance among the small base stations 1 to 9, the signal transmission strength of each of the small base stations 1 to 9, a concentration degree of terminals in a macro cell C100 associated with the small base stations 1 to 9, and the number of the small base stations 1 to 9 in a macro cell C100.

Hereinafter, an embodiment will be described in which the first weight $\eta_1$ and/or the second weight $\eta_2$ is differently applied.

According to a first exemplary embodiment, the first weight $\eta_1$ and/or the second weight $\eta_2$ may become different so that the second weight $\eta_2$ is larger than the first weight $\eta_1$, when the frequency band used by each of the small base stations 1 to 9 is different from the frequency band of the macro cell C100, as the average distance among the base stations becomes larger, as the signal transmission strength of the small base stations 1 to 9 becomes smaller, or as the number of the small base stations 1 to 9 becomes smaller.

The small base stations 1 to 9 located in the macro cell C100 may or may not use the same frequency band as that of the macro base station 100.

If it is desired to avoid signal interference between the macro base station and the small base stations in establishing a heterogeneous network environment, the small base stations 1 to 9 would be designed to use frequency bands different from the frequency band of the macro base station 100.

Similarly, if it is desired avoid signal interference between the macro base station and the small base stations in establishing a heterogeneous network environment, the signal transmission strength of the small base stations 1 to 9 would be designed to be relatively small so that the coverage of the small cells is not too large.

In addition, if it is desired to avoid signal interference between the small base stations in establishing a heterogeneous network environment, the small base stations would be designed to be located not too close to one another, such that the average distance among the base stations would be large.

In addition, it is to be understood that the smaller the number of small base stations located in macro cell C100, the smaller the signal interference between small base stations.

Accordingly, if the frequency band used by each of the small base stations 1 to 9 is different from the frequency band of the macro cell C100, as the average distance among the base stations becomes larger, as the signal transmission strength of the small base stations 1 to 9 becomes smaller, or as the number of the small base stations 1 to 9 in the macro cell C100 becomes smaller, it is more likely that the signal interference can be avoided to some extent by the design and installation topology or naturally, and it is necessary to consider the traffic volume more than the signal interference.

Therefore, if the frequency band used by each of the small base stations 1 to 9 is different from the frequency band of the macro cell C100, as the average distance among the base stations becomes larger, as the signal transmission strength of the small base stations 1 to 9 becomes smaller, or as the number of the small base stations 1 to 9 in the macro cell C100 becomes smaller, the base station controller 200, especially the activation index calculation unit 230 according to an exemplary embodiment of the present disclosure may adjust the second weight $\eta_2$, for example, so that the second weight $\eta_2$ becomes larger than the first weight $\eta_1$.

In this case, the activation index calculation unit 230 may apply the second weight $\eta_2$ adjusted to be larger than the first weight $\eta_1$ to Equation 1 and may calculate the activation index for each of the small base stations 1 to 9.

On the other hand, in a situation where it is not likely that the signal interference can be avoided by the design and installation topology or naturally, the first weight $\eta_1$ and/or the second weight $\eta_2$ may be differently applied so that the second weight $\eta_2$ is equal to or less than the first weight $\eta_1$.

That is, if the frequency band used by each of the small base stations 1 to 9 is the same as the frequency band of the macro cell C100, as the average distance between the base stations becomes smaller, as the signal transmission strength of the small base stations 1 to 9 becomes larger, as the number of the small base stations 1 to 9 becomes larger, or as the concentration degree of the terminals in the macro cell C100 becomes larger, the first weight $\eta_1$ and/or the second weight $\eta_2$ may become different so that the second weight $\eta_2$ is equal to or less than the first weight $\eta_1$.

According to a second exemplary embodiment, if the frequency band used by each of the small base stations 1 to 9 is the same as the frequency band of the macro cell C100, as the average distance among the base stations becomes smaller, as the signal transmission strength of the small base stations 1 to 9 becomes larger, or as the number of the small base stations 1 to 9 in the macro cell C100 becomes larger, it is not likely that the signal interference can be avoided by the design and installation topology or naturally unlike the first exemplary embodiment, rather it is likely that the signal interference may become serious. Therefore, it is necessary to consider the signal interference more than the traffic volume or as much as the traffic volume.

Accordingly, if the frequency band used by each of the small base stations 1 to 9 is the same as the frequency band of the macro cell C100, as the average distance among the base stations becomes smaller, as the signal transmission strength of the small base stations 1 to 9 becomes larger, or as the number of the small base stations 1 to 9 in the macro cell C100 becomes larger, the base station controller 200, especially the activation index calculation unit 230 according to an exemplary embodiment of the present disclosure may adjust the second weight $\eta_2$, for example, so that the second weight $\eta_2$ becomes equal to or less than the first weight $\eta_1$.

In this case, the activation index calculation unit 230 may apply the second weight $\eta_2$ adjusted to be equal to or less than the first weight $\eta_1$ to Equation 1 and may calculate the activation index for each of the small base stations 1 to 9.

On the other hand, according to a third exemplary embodiment, as the concentration degree of terminals in the macro cell C100 is larger, it is necessary to consider the signal interference more than the traffic volume in the calculation of the activation index.

This is because, when a number of small base stations are activated in a particular area where the terminals in the macro cell C100 are densely distributed, the effect of offloading a terminal of the macro base station 100 to a small base station would be ignorable whereas the signal interference between small base stations would be large.

Accordingly, as the concentration degree of the terminals in the macro cell C100 is larger, the base station controller 200, especially the activation index calculation unit 230 according to an exemplary embodiment of the present disclosure may adjust the first weight $\eta_1$, for example, so that the second weight $\eta_2$ becomes smaller than the first weight $\eta_1$.

In this case, the activation index calculation unit 230 may apply the first weight $\eta_1$ adjusted to be larger than the second weight $\eta_2$ to Equation 1 and may calculate the activation index for each of the small base stations 1 to 9.

As described above, the base station controller 200 according to an exemplary embodiment of the present disclosure applies the first weight $\eta_1$ and the second weight $\eta_2$, which vary according to environmental factors of a heterogeneous network environment, to the signal interference and the traffic volume respectively, to calculate the activation index for each of the small base stations, such that the weights of the signal interference and the traffic volume associated with the small base stations can be adjusted according to the environment. As a result, the optimal activation index with high reliability can be calculated.

The base station control unit 240 determines whether to activate or deactivate each of the small base stations 1 to 9 based on the activation index of each of the small base stations 1 to 9.

More specifically, the base station control unit 240 sequentially activates the small base stations 1 to 9 from one with the largest activation index based on the activation index for each of the small base stations 1 to 9.

In other words, the base station control unit 240 determines whether to activate or deactivate each of the small base stations 1 to 9 based on the activation index of each of the small base stations 1 to 9 in the macro cell C10 calculated based on both of the traffic volume and the signal interference, and operates the small base stations 1 to 9 in the determined activated or deactivation state.

More specifically, the base station control unit 240 sequentially selects and activates the small base stations 1 to 9 in the descending order from one with the largest activation index.

In addition, whenever the base station control unit 240 selects a small base station sequentially, it determines whether or not the network environment after the currently selected small base station has been activated satisfies a predetermined operation holding condition. If the operation holding condition is satisfied, the currently selected small base station and previously activated at least one base station are operated in the activated state, while the other base stations are operated in the deactivated state.

In other words, the base station control unit 240 sequentially selects and activates the small base stations in the descending order from the small base station with the largest activation index, until the network environment satisfies the operation holding condition. This may be referred to as the above-described operation setting period X for determining activation or deactivation of the small base stations 1 to 9.

In addition, if the network environment satisfies the operation holding condition, the base station control unit 240 holds some of the small base stations 1 to 9, that are activated at the time when the operation holding condition is satisfied, in the activated state, and the other small base stations that are deactivated at the time in the deactivated state. This may be referred to as the above-described operation holding period Y.

Herein, the network environment may refer to a change in the cell capacity of the cell, i.e., the macro cell C100 associated with the number of base stations, i.e., the small base stations 1 to 9, or may be the connection ratio of terminals connected to the activated small base stations among the small base stations 1 to 9 with respect to the entire terminals in the macro cell C100.

The operation holding condition may be satisfied if the change in the cell capacity of the macro cell C100 is equal to or less than a predetermined first threshold, or if the connection ratio of the terminals connected to the activated small base stations among the small base stations 1 to 9 is equal to or greater than a predetermined second threshold.

Consequently, the operation holding condition may be a criterion for transitioning from the operation setting period X for determining activation or deactivation of the small base stations 1 to 9 to the operation holding period Y.

Hereinafter, more detailed descriptions will be made on the assumption that the small base stations 1 to 9 are arranged in the descending order from one with the largest activation index as follows:

small base station 4>3>2>1>5>6>7>8>9

In this case, the base station control unit 240 would sequentially select and activate the small base stations in the descending order from the small base station with the largest activation index, i.e., the small base station 4, the small base station 3, the small base station 2, the small base station 1, the small base station 5, and so on.

Hereinafter, an operation for determining whether to activate or deactivate each of the small base stations 1 to 9 by the base station control unit 240 will be described in detail.

Initially, the base station control unit 240 selects and activates the small base station 4 with the largest activation index among the small base stations 1 to 9.

The base station control unit 240 determines whether or not the network environment after the currently selected small base station 4 has been activated satisfies the operation holding condition.

That is, the base station control unit 240 may determine that the operation holding condition is satisfied if the change in the cell capacity of the macro cell C100 before and after the activation of the small base station 4 is equal to or less than the predetermined first threshold.

This is because, if the change in the cell capacity of the macro cell C100 is equal to or less than the first threshold value, the change in the cell capacity increased by activating the small base station 4 is insignificant, and thus it is not likely that the cell capacity can be increased even when any more small base station is activated.

Alternatively, the base station control unit 240 may determine that the operation holding condition is satisfied if the terminal connection ratio after the activation of the small base station 4 is equal to or greater than the predetermined second threshold.

This is because, if the connection ratio of the terminals connected to the small base stations with respect to the entire terminals in the macro cell C100 is equal to or greater than the second threshold, the connection ratio of the terminals connected to the small base stations has become sufficiently large beyond the second threshold value by activating the base station 4. Therefore, the determination is based on that it is not necessary to activate any more small base station for off-loading to the small base stations.

However, since the small base station 4 currently activated is the first activated small base station among the small base stations 1 to 9, it would be not likely to satisfy the operation holding condition.

As such, if the operation holding condition is not satisfied after the small base station 4 has been selected and activated, the base station control unit 240 selects and activates the small base station 3 with the second largest activation index.

Also in this case, the base station control unit 240 determines whether the network environment after the currently selected small base station 3 has been activated satisfies the operation holding condition. In other words, the base station control unit 240 may determine whether the change in the cell capacity of the macro cell C100 before and after the activation of the small base station 3 is equal to or less than the first threshold, or whether the connection ratio of the terminals after the small base station 3 has been activated is equal to greater than the second threshold.

If the operation holding condition is not satisfied after the small base station 3 has been selected and activated, the base station control unit 240 selects and activates the small base station 2 with the third largest activation index.

In this manner, the base station control unit 240 repeats the operations of sequentially selecting and activating the small base stations in the descending order from the small base station with the largest activation index, until the operation holding condition is satisfied.

In the following description, it is assumed that after the small base stations 4, 3, 2 and 1 have been sequentially activated in this order, and the small base station 5 is selected and activated and then the operation holding condition is satisfied.

In this case, the base station control unit 240 may operate the currently selected small base station 5 and the previously activated small base stations 4, 3, 2 and 1 in the activated state while operating the other small base stations 6, 7, 8 and 9 in the deactivated state.

That is, the base station control unit 240 operates in the above-described operation maintenance period Y such that the small base stations 1, 2, 3, 4, and 5 activated at the time when the operation holding condition is satisfied keep operating in the activated state while the small base stations 6, 7, 8, and 9 deactivated at the time keep operating in the deactivated state.

As described above, in a heterogeneous network environment in which several base stations forming cells of different sizes coexist in the same area, the base station controller 200 according to an exemplary embodiment of the present disclosure optimally controls the activation/deactivation of the small base stations by taking into account the traffic volume together with the signal interference. As a result, the effects of increasing the cell capacity and the terminal throughput can be achieved.

In the above description, the activation/deactivation control of the small base stations is performed by the central base station controller 200. However, all or a part of the functional units of the base station controller 200 may be disposed in each of the small base stations, such that each of the small base stations may determine whether to be activated or deactivated by itself independently or in cooperation with the base station controller 200 and may be operated accordingly.

Hereinafter, a method for operating a base station controller according to an exemplary embodiment of the present disclosure will be described with reference to FIG. 4. For convenience of illustration, the same reference numerals as those of FIGS. 1 to 3 are used in the following description.

In the method for operating the base station controller 200 according to an exemplary embodiment of the present disclosure, as described above with reference to FIG. 3, the activation/deactivation of the small base stations may be periodically controlled, with the operation setting period X and the operation holding period Y as one cycle (X+Y).

In the following description, a process of controlling activation/deactivation will be described where the single macro base station 100 and the small base stations 1 to 9 located in the same macro cell C100 of the macro base station 100 are disposed as shown in FIG. 1.

The method for operating the base station controller 200 includes checking the traffic volume of each of the small base stations 1 to 9 (step S100).

That is, the method may include collecting measurements of the strength of received signals from each of the small base stations 1 to 9 through the above-described backhaul or the BU to check the traffic volume around each of the small base stations 1 to 9.

Then, the method includes checking the signal interference of each of the small base stations 1 to 9 with an adjacent base station (step S110).

That is, the method may include collecting RSSIs provided from each of the small base stations 1 to 9 through the above-described backhaul or the BU to check the signal interference of each of the small base stations 1 to 9.

Subsequently, the method includes calculating the activation index of each of the small base stations 1 to 9 based on the traffic volume and the signal interference of each of the small base stations 1 to 9.

More specifically, the method includes determining the first weight $\eta_1$ and the second weight $\eta_2$ differently depending on the environmental factors of the heterogeneous network environment (step S120). The activation index for each of the small base stations 1 to 9 may be calculated by applying the first weight $\eta_1$ and the second weights $\eta_2$ thus determined to Equation 1 (step S130).

According to the first exemplary embodiment, if the frequency band used by each of the small base stations 1 to 9 is different from the frequency band of the macro cell C100, as the average distance among the base stations becomes larger, as the signal transmission strength of the small base stations 1 to 9 becomes smaller, or as the number of the small base stations 1 to 9 in the macro cell C100 becomes smaller, the method includes adjusting (determining) the second weight $\eta_2$, for example, so that the second weight $\eta_2$ becomes larger than the first weight $\eta_1$.

Alternatively, according to the second exemplary embodiment, if the frequency band used by each of the small base stations 1 to 9 is the same as the frequency band of the macro cell C100, as the average distance among the base stations becomes smaller, as the signal transmission strength of the small base stations 1 to 9 becomes larger, or as the number of the small base stations 1 to 9 in the macro cell C100 becomes larger, the method includes adjusting (determining) the second weight $\eta_2$, for example, so that the second weight $\eta_2$ becomes equal to or smaller than the first weight $\eta_1$.

Alternatively, according to the third exemplary embodiment, as the concentration degree of the terminals in the macro cell C100 becomes larger, the method includes adjusting (determining) the first weight $\eta_1$, for example, so that the second weight $\eta_2$ becomes smaller than the first weight $\eta_1$.

Subsequently, the method may include applying the first weight $\eta_1$ and the second weight $\eta_2$ adjusted (determined) according to the first, second or third exemplary embodiments to Equation 1, to calculate the activation index for each of the small base stations 1 to 9.

Subsequently, the method may include sequentially selecting and activating the small base stations in the descending order from one with the largest activation index, until the network environment satisfies the operation holding condition (steps S140 and S150).

Hereinafter, more detailed descriptions will be made on the assumption that the small base stations 1 to 9 are arranged in the descending order from one with the largest activation index as follows.

Subsequently, the method may include sequentially selecting and activating the small base stations in the descending order from one with the largest activation index, e.g., the small base station 4, the small base station 3, the small base station 2, the small base station 1, the small base station 5, and so on.

Initially, the method may include selecting and activating the small base station 4 with the largest activation index among the small base stations 1 to 9 (step S140).

The method may include determining whether or not the network environment satisfies the operation holding condition after the activation of the currently selected small base station 4, that is, whether the change in the cell capacity of the macro cell C100 before and after the small base station 4 has been activated is equal to or less than the first threshold, or whether the connection ratio after the small base station 4 has been activated is equal to or higher than the second threshold (step S140).

However, since the small base station 4 currently activated is the first activated small base station among the small base stations 1 to 9, it is not likely to satisfy the operation holding condition.

If the operation holding condition is not satisfied after the small base station 4 has been selected and activated (No in step S140), it returns to step S130. Subsequently, the small base station 3 with the second largest activation index, i.e., the small base station 3 with the largest activation index among the remaining small base stations 1 to 3 and 5 to 9, is selected and activated.

Also in this case, the method may include determining whether or not the network environment satisfies the operation holding condition after the activation of the currently selected small base station 3, that is, whether the change in the cell capacity of the macro cell C100 before and after the small base station 3 has been activated is equal to or less than the first threshold or whether the terminal connection ratio after the small base station 3 has been activated is equal to or higher than the second threshold (step S140).

If the operation holding condition is not satisfied after the small base station 3 has been selected and activated (No in step S140), it returns to step S130. Then, the small base station 2 with the third largest activation index is selected and activated.

In this manner, the method includes repeating the operations of sequentially selecting and activating the small base stations in the descending order from the small base station with the largest activation index, until the operation holding condition is satisfied.

Figure 4:
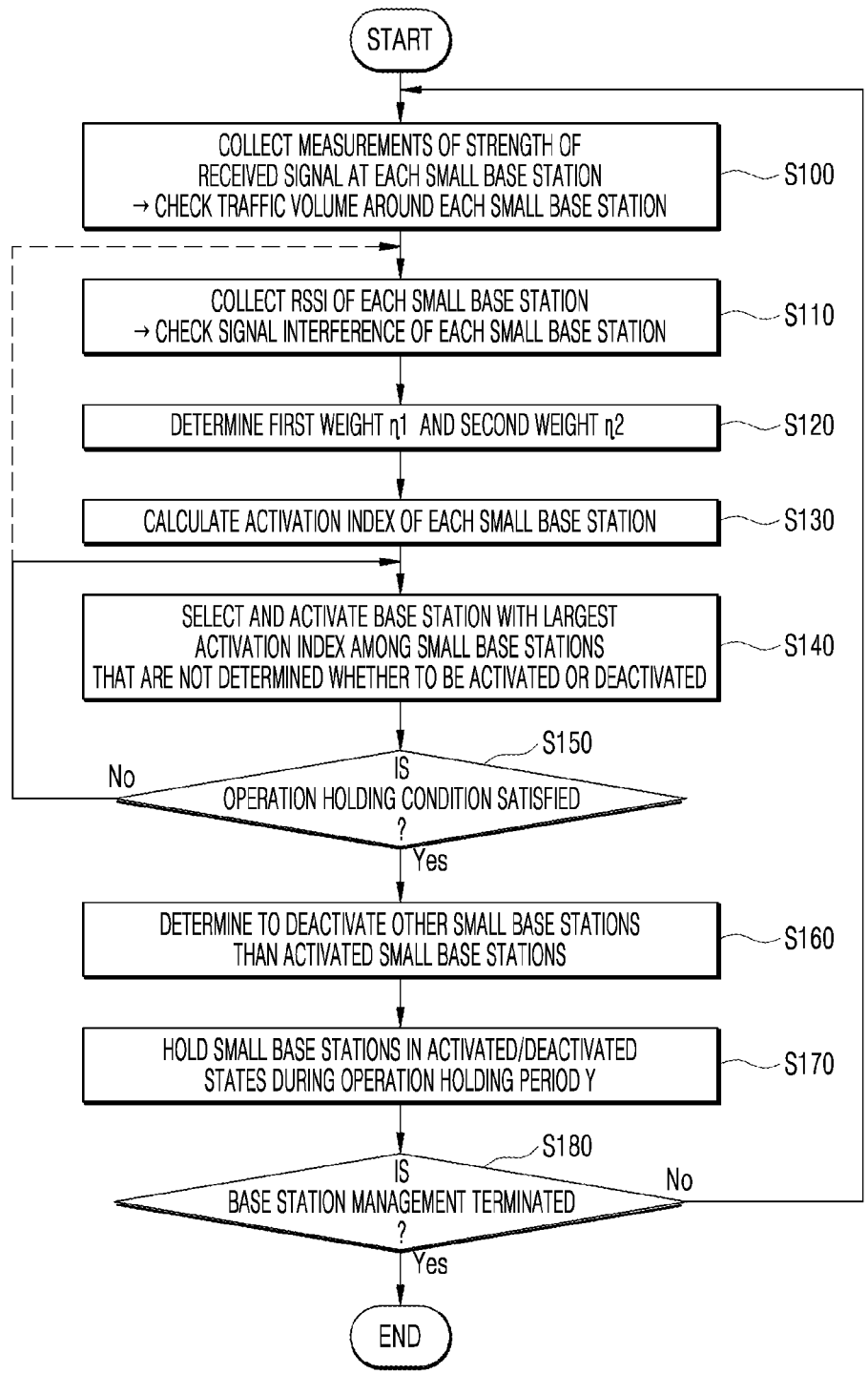
FIG. 4 is a flow chart illustrating a method for operating a base station controller according to an exemplary embodiment of the present disclosure.

Although the base station controller 200 according to the exemplary embodiment of the present disclosure returns to step S130 if the operation holding condition is not satisfied (No in step S140) in the description with respect to FIG. 4, this is merely illustrative.

For example, in order to reduce overhead and complexity for the activation/deactivation control of the small base stations, it may return to step S130 if the operation holding condition is not satisfied as shown in FIG. 4 (No in step S140). Alternatively, in order to continuously consider the signal interference of the varying downlink, it may return to step S110 if the operation holding condition is not satisfied (No in step S140).

In the following description, it is assumed that after the small base stations 4, 3, 2 and 1 have been sequentially activated in this order, and the small base station 5 is selected and activated and then the operation holding condition is satisfied.

In this case, the method includes determining to deactivate the small base stations 6, 7, 8 and 9 other than the currently selected small base station 5 and at least one small base station including the small base stations 4, 3, 2 and 1 that are previously activated (step S160).

The steps S140 to S160 may be referred to as the above-described operation setting period X for determining whether to activate or deactivate the small base stations 1 to 9.

In addition, the method may include operating in the above-described operation maintenance period Y, in which the small base stations 1, 2, 3, 4, and 5 activated at the time when the operation holding condition is satisfied keep operating in the activated state while the small base stations 6, 7, 8, and 9 deactivated at the time keep operating in the deactivated state (step S170).

Subsequently, unless the management function for the base stations is terminated (No in step S180), it returns to step S100 when the operation holding period Y elapses, and the above-described steps after the step S100 may be repeated.

During the operation holding period Y in which the small base stations 1, 2, 3, 4, and 5 keep operating in the activated state while the small base stations 6, 7, 8, and 9 keep operating in the deactivated state, the above-described steps S100 to S130 may be performed in parallel to newly calculate the activation index of each of the small base stations 1 to 9 in advance. Then, when the operation holding period Y elapses, the process may return to step S140 and the subsequent steps may be repeated.

As described above, in a heterogeneous network environment in which several base stations forming cells of different sizes coexist in the same area, the method for operating the base station controller according to the exemplary embodiment of the present disclosure takes into account both of the traffic volume and the signal interference, such that the activation/deactivation of the small base stations can be optimally controlled. As a result, the effects of increasing the cell capacity and the terminal throughput can be achieved.

The method for operating a base station controller according to an exemplary embodiment of the present disclosure may be implemented as program instructions that may be executed by a various types of computers and may be stored in a computer-readable medium. The computer-readable medium may include program instructions, data files, data structure or the like alone or a combination thereof. The program instructions stored on the medium may be ones specially configured for the present disclosure or any ones well known and available to those skilled in the field of computer software. Examples of the computer-readable storage medium may include magnetic media such as a hard disk, a floppy disk and a magnetic tape; optical media such as a CD-ROM and a DVD; magneto-optical media such as a floppy disk; and hardware devices specially configured to store and execute program instructions, such as a ROM, a RAM, a flash memory or the like. Examples of the program instructions may include machine language codes such as ones being made by compilers as well as high-level language codes capable of being executed by computers using interpreters or the like. The hardware devices may be configured to be operated as one or more software modules to perform operations according to the exemplary embodiments of the present disclosure, or vise versa.

Although the exemplary embodiments of the present disclosure have been described for illustrative purposes, those skilled in the art will appreciate that various modifications, additions and substitutions are possible without departing from the scope and spirit of the present disclosure as defined by the appended claims. Such modifications, additions and substitutions are also construed as falling within the scope of the present disclosure.

The invention claimed is:

1. A base station controller,
the base station controller configured to control activation and deactivation of a plurality of small base stations included in a macro cell, in consideration of both a traffic volume of each of the plurality of small base stations and a signal interference of each of the plurality of small base stations, based on an activation index which is calculated by applying both a first weight to signal interference of each of the plurality of small base stations and a second weight to the traffic volume of each of the plurality of small base stations,
wherein the macro cell includes a plurality of small cells configured by the plurality of small base stations,
wherein the base station controller comprises:
a traffic volume check unit configured to check the traffic volume of each of the plurality of small base stations;
an interference check unit configured to check the signal interference of each of the plurality of small base stations with an adjacent small base station;
an activation index calculation unit configured to calculate the activation index, indicating weights for the traffic volume and the signal interference of each of the plurality of small base stations, for each of the plurality of small base stations by applying the first weight to the signal interference of each of the plurality of small base stations and applying the second weight to the traffic volume of each of the plurality of small base stations; and
a base station control unit configured to determine whether to activate each of the plurality of small base stations based on the activation index of each of the plurality of small base stations, and
wherein the traffic volume of each of the plurality of small base stations is obtained from measurements of strength of an uplink signal received at each of the plurality of small base stations from one or more terminals or a signal received via an uplink channel at each of the plurality of small base stations, and
wherein the signal interference of each of the plurality of small base stations is obtained from a received signal strength indicator (RSSI), wherein the RSSI is fed back to each of the plurality of small base stations from a terminal.

2. The base station controller according to claim 1, wherein the base station control unit sequentially activates the plurality of small base stations from a small base station with a largest activation index among the plurality of small base stations, based on the activation index of each of the plurality of small base stations.

3. The base station controller according to claim 1, wherein the activation index of each of the plurality of small base stations is calculated as a larger value as the traffic volume is larger, as the signal interference is smaller or as the traffic volume is larger and the signal interference is smaller.

4. The base station controller according to claim 1, wherein at least one of the first weight and the second weight is differently applied based on at least one of: a frequency band used by each of the plurality of small base stations, an average distance among the plurality of small base stations, a signal transmission strength of the plurality of small base stations, a concentration degree of terminals in a cell associated with the plurality of small base stations, and the number of the small base stations.

5. The base station controller according to claim 4,
wherein the second weight becomes larger than the first weight when the frequency band is different from a frequency band of the cell, as the average distance among the plurality of small base stations becomes larger, as the signal transmission strength becomes smaller, or as the number of the small base stations becomes smaller, and
wherein the second weight becomes equal to or smaller than the first weight as the frequency band becomes closer to the frequency band of the cell, as the average distance among the plurality of small base stations becomes smaller, as the signal transmission strength becomes larger, as the number of the small base stations becomes larger, or as the concentration degree of terminals becomes larger.

6. The base station controller according to claim 2, wherein the base station control unit sequentially selects and activates a small base station in a descending order from one with the largest activation index, and measures a network environment whenever activating the selected small base station, to operate at least one previously activated small base station and the selected small base station in an activated state and the other small base stations in a deactivated state, when the measured network environment satisfies a predetermined operation holding condition.

7. The base station controller according to claim 6,
wherein the network environment comprises a change in a cell capacity of the cell before and after the activation of the selected small base station, or a connection ratio of terminals connected to the activated small base stations with respect to entire terminals in the cell, and
wherein the operation holding condition is satisfied when the change in the cell capacity is equal to less than a predetermined first threshold or the connection ratio of terminals is equal to greater than a predetermined second threshold.

8. A method for operating a base station controller in a macro cell, the method comprising:
checking a traffic volume of each of plurality of small base stations;
checking a signal interference of each of the plurality of small base stations with an adjacent small base station;
calculating an activation index for each of the plurality of small base stations based on the traffic volume and the signal interference of each of the plurality of small base stations; and
determining whether to activate each of the plurality of small base stations based on the activation index of each of the plurality of small base stations,
wherein the macro cell includes a plurality of small cells configured by the plurality of small base stations,
wherein the traffic volume of each of the plurality of small base stations is obtained from measurements of strength of an uplink signal received at each of the plurality of small base stations from one or more terminals or a signal received via an uplink channel at each of the plurality of small base stations, and wherein the signal interference of each of the plurality of small base stations is obtained from a received signal strength indicator (RSSI), wherein the RSSI is fed back to each of the plurality of small base stations from a terminal.

9. The method according to claim 8, wherein the determining comprises sequentially activating the plurality of small base stations from a small base station with a largest activation index among the plurality of small base stations, based on the activation index of each of the plurality of small base stations.

10. The method according to claim 8, wherein the activation index of each of the plurality of small base stations is calculated as a larger value as the traffic volume is larger, as the signal interference is smaller or as the traffic volume is larger and the signal interference is smaller.

11. The method according to claim 8, wherein the calculating comprises calculating the activation index by applying a first weight to the signal interference of each of the plurality of small base stations and applying a second weight to the traffic volume of each of the plurality of small base stations, and wherein at least one of the first weight and the second weight is differently applied based on at least one of: a frequency band used by each of the base stations, an average distance among the base stations, a signal transmission strength of the plurality of small base stations, a concentration degree of terminals in a cell associated with the base stations, and the number of the plurality of small base stations.

12. The method according to claim 9, wherein the determining comprises sequentially selecting and activating a small base station in a descending order from one with the largest activation index, and measuring a network environment whenever activating the selected small base station, to operate at least one previously activated small base station and the selected small base station in an activated state and the other base stations in a deactivated state, when the measured network environment satisfies a predetermined operation holding condition.

13. The method according to claim 12, wherein an operation setting period and an operation holding period are repeated periodically, wherein each of the plurality of small base stations is activated or deactivated during the operation setting period based on its activation index, and the operation of each of the plurality of small base stations is held in the activated or deactivated state as determined when the operation holding condition is satisfied during the operation holding period.

* * * * *